US009682496B2

(12) United States Patent
Fairweather et al.

(10) Patent No.: US 9,682,496 B2
(45) Date of Patent: Jun. 20, 2017

(54) CHOP SAW WITH DUST COLLECTION SYSTEM (71) Applicant: JPL Global, LLC, Moreno Valley, CA (US)

(72) Inventors: Mitch Fairweather, Nampa, ID (US); Stephen M. Curtis, Nampa, ID (US); Paul W. Guth, Menifee, CA (US); Randy Ott, Boise, ID (US)

(73) Assignee: JPL GLOBAL, LLC, Moreno Valley, CA (US)

( * ) Notice: Subject to any disclaimer, the term of this patent is extended or adjusted under 35 U.S.C. 154(b) by 287 days.

(21) Appl. No.: 14/506,531

(22) Filed: Oct. 3, 2014

(65) Prior Publication Data
US 2015/0020661 A1 Jan. 22, 2015

Related U.S. Application Data (63) Continuation of application No. 12/497,390, filed on Jul. 2, 2009, now Pat. No. 8,869,786.

(60) Provisional application No. 61/152,574, filed on Feb. 13, 2009, provisional application No. 61/078,250, filed on Jul. 3, 2008.

(51) Int. Cl.
B28D 7/02 (2006.01)
B24B 27/06 (2006.01)
B23Q 11/00 (2006.01)
B28D 7/04 (2006.01)
(Continued)

(52) U.S. Cl.
CPC ............. *B28D 7/02* (2013.01); *B23D 47/025* (2013.01); *B23D 59/006* (2013.01); *B23Q 11/0046* (2013.01); *B23Q 11/0067* (2013.01); *B24B 27/065* (2013.01); *B28D 7/046* (2013.01); *Y02P 70/171* (2015.11); *Y10T 83/207* (2015.04);
(Continued)

(58) Field of Classification Search
CPC ....... B24B 27/02; B24B 27/065; B24B 55/06; B24B 55/10; B24B 55/102; B28D 7/02; B28D 7/046; B23D 47/025; B23D 59/006; B23D 59/007; B23Q 11/0046; B23Q 11/0067; Y10T 83/207; Y10T 83/773
USPC ....................... 125/13.03; 451/361, 411, 456
See application file for complete search history.

(56) References Cited

U.S. PATENT DOCUMENTS 3,808,750 A * 5/1974 Mann ...................... B24B 55/06
433/25
3,913,431 A * 10/1975 Lambert ................ B23D 45/12
83/100

(Continued)

Primary Examiner — Eileen Morgan
(74) Attorney, Agent, or Firm — Loza & Loza, LLP; Daniel S. Castro (57) ABSTRACT A chop saw, grinding wheel, or like apparatus is disclosed herein also incorporated to an easily portable dust collection system. In a preferred embodiment, a worktable is provided with a center slot for receiving a circular saw blade. A negative pressure and resulting air flow is provided at the center slot to capture particulate matter as a byproduct of cutting the workpiece. Side slots are also disclosed to assist in particulate collection. A unique filter chamber having a cylindrical filter is additionally provided to remove dust from air and discharge the filtered air at a lateral side of the apparatus. A filter cleaning knob is additionally disclosed to assist in cleaning the filter. Of the beneficial aspects of the chop saw with dust collection system is its portability being one integral unit and the dust filter being easily cleaned and maintained.

14 Claims, 6 Drawing Sheets (51) Int. Cl.
 B23D 47/02 (2006.01)
 B23D 59/00 (2006.01)
(52) U.S. Cl.
 CPC .......... *Y10T 83/7693* (2015.04); *Y10T 83/773* (2015.04); *Y10T 83/7726* (2015.04)

(56) References Cited

U.S. PATENT DOCUMENTS

| | | | | | |
|---|---|---|---|---|---|
| 4,063,059 | A | * | 12/1977 | Brolund | B08B 15/002 219/121.39 |
| 4,201,256 | A | * | 5/1980 | Truhan | B01D 45/12 144/252.2 |
| 4,214,493 | A | * | 7/1980 | Elhaus | B23D 45/021 83/100 |
| 4,485,712 | A | * | 12/1984 | Gerber | B25B 11/005 83/100 |
| 4,549,728 | A | * | 10/1985 | Odeau | B65H 29/68 270/46 |
| 4,576,072 | A | * | 3/1986 | Terpstra | B23D 47/025 83/100 |
| 4,706,326 | A | * | 11/1987 | Romani | A47L 5/365 15/314 |
| 5,131,192 | A | * | 7/1992 | Cheng | A61C 3/025 144/252.2 |
| 5,271,123 | A | * | 12/1993 | Teske | B08B 15/04 15/301 |
| 5,655,253 | A | * | 8/1997 | Nevin | A47L 7/00 15/310 |
| 5,807,414 | A | * | 9/1998 | Schaefer | B23K 9/325 55/385.2 |
| 6,444,002 | B1 | * | 9/2002 | Mai | A45D 29/00 454/56 |
| 6,470,778 | B1 | * | 10/2002 | Kaye, Jr. | B23D 59/006 144/252.1 |
| 6,510,772 | B2 | * | 1/2003 | Brickner, Jr. | B08B 15/04 15/339 |
| 7,013,884 | B2 | * | 3/2006 | Guth | B23Q 11/0046 125/13.01 |
| 7,216,572 | B2 | * | 5/2007 | Keenan | B23D 59/006 144/252.1 |
| 8,082,825 | B2 | * | 12/2011 | Butler | B23D 59/006 83/471.3 |
| 2004/0206220 | A1 | * | 10/2004 | Keenan | B23D 59/006 83/100 |
| 2005/0205075 | A1 | * | 9/2005 | Guth | B23Q 11/0046 125/13.01 |
| 2006/0201295 | A1 | * | 9/2006 | Jorgensen | B23D 59/006 83/100 |
| 2008/0163492 | A1 | * | 7/2008 | Johansson | B23D 59/006 30/124 |
| 2009/0007440 | A1 | * | 1/2009 | Soika | B23D 59/006 30/388 |
| 2010/0307307 | A1 | * | 12/2010 | Butler | B23D 59/006 83/58 |
| 2012/0118244 | A1 | * | 5/2012 | Finch | A01K 13/001 119/600 |

* cited by examiner

CHOP SAW WITH DUST COLLECTION SYSTEM

PRIORITY CLAIM

This application is a continuation of U.S. patent application Ser. No. 12/497,390, filed Jul. 2, 2009, entitled "CHOP SAW WITH DUST COLLECTION SYSTEM," which claims priority to and the benefit of provisional U.S. patent application No. 61/078,250, filed on Jul. 3, 2008, entitled "COMBINATION CHOPSAW AND DUST COLLECTION SYSTEM," and provisional U.S. patent application No. 61/152,574, filed on Feb. 13, 2009, entitled "COMBINATION CHOPSAW AND DUST COLLECTION SYSTEM." Accordingly, the entire contents of each of the aforementioned patent applications are hereby expressly incorporated by reference.

BACKGROUND OF THE INVENTION

Field of the Invention

The present invention pertains generally to power masonry tools and related devices for cutting and grinding. More specifically, the present invention relates to power saws of the "cutoff" type and systems that further maximize containment of dust contaminant while cutting cinder block, concrete, brick, clay, stone, tile and the like.

Description of the Prior Art

Power saws of the "cut-off" variety have been known for some time that employ a rotating circular blade applied to a stationary workpiece, such as wood, masonry or stone materials. An early version of a radial saw was invented by Raymond De Walt in 1922. These types of saws further include what is known as a "chop saw" which may be used for cutting lengths of pipe, steel, and other masonry objects. The chop saw comprises a 111otor coupled to a circular blade (or grinding wheel) pivotally supported for manual arcuate movement relative to a supporting surface such as a worktable.

An example of systems and methods comprising a chop saw are disclosed in U.S. Pat. No. 7,543,522 entitled "Adjustable Fence Assembly for Chop Saw," to Chen. Some additional features known for chop saws include compounding the blade to change its angle with respect to the horizontal plane; or a sliding compound feature so that the blade can make larger cuts relative to a circular blade diameter. Some chop saws further employ a laser guide such as the configuration disclosed in U.S. Pat. No. 4,257,297 entitled "Circular Saw with Visual Cut Line Indicator," to Nidbella.

Also known, is a problem of uncontrolled release of and exposure to airborne dust and particulate matter resulting from cutting a workpiece. Accordingly, government agencies such as OSHA have promulgated safety and health requirements for wet and dry cutting. The California Occupational Safety and Health Act of 1973 requires employers to provide a safe and healthful work place and gives Cal-lOSHA regulatory jurisdiction over all public and private employers in California. Henceforth, employers must be compliant with all regulations set forth in Title 8 of The California Code of Regulations. In addition to health issues, the dust by-products present a clean-up challenge, even if all individuals in a contained environment have donned respirators.

Development of wet cutting devices and methods is one solution to dust abatement. In doing so, water is applied at a blade cutting edge where dust is entrained to a fluid and directed to a holding area. While most wet cutting methods work relatively well, they create additional problems of waste water pollution and environmental concerns. Further, the slurry created will adhere to cutting tool materials and components that also require periodic cleaning.

Many prior art solutions have been proposed that specifically employ dry means to control dust. Examples of such designs include, "Cutting And Dust Collecting Assembly," by Johansson, U. S. Pat. App. Pub. No. 2008/0163492, "Cutting Apparatus with Dust Discharging," to Kodani et al., U.S. Pat. No. 7,223,161, "Dust-Free Masonry Cutting Tool," to Bath, U.S. Pat. No. 6,595,196, "Dust Collector for A Power Tool," by Miller et al., U. S. Pat. Pub. No. 2007/0017191, to name a few. Such solutions generally may be suitable for their general purposes however none of these solutions are applicable for a chop saw. Yet another similar device was proposed by one of the present inventors, Guth entitled "Dust Collection System for A Masonry Saw," U.S. Pat. No. 7,013,884, and assigned to Masonry Technology Incorporated. This dust abatement design is applicable to a masonry chop saw; however this design is not easily portable and requires a separate hook up to a vacuum system.

In light of the above, it is an object of the present invention to provide a Chop Saw with Dust Collection that is highly portable and lighter in weight as compared prior art solutions. More specifically, it is an object of the present invention to provide a masonry chop saw that integrates dust collection to a single portable unit. It is still a further object of the present invention to provide a dry dust collection design that is easily cleaned. It is still further an object of the present invention to provide a design that includes a variety of innovative features over prior designs.

BRIEF SUMMARY OF THE INVENTION

The present invention specifically addresses and alleviates the above mentioned deficiencies, more specifically, the present invention, in a first aspect, is directed to a cut off saw comprising: a worktable for supporting a work piece; a rotatable arm fixed to a circular saw blade and pivotably secured to the worktable; a center slot carved out of the worktable axially aligned to the circular saw blade; a vacuum apparatus at an interior of the worktable, the vacuum apparatus providing negative pressure with respect to atmosphere at the center slot and collecting dust from the work piece created as a byproduct from use of the cut off saw.

The invention embodiment is additionally characterized in that worktable further comprises: a saw motor mechanically coupled to a circular saw blade; an upper housing; and a lower dust bin connected below the upper housing, the upper housing and lower dust bin each including a front panel, a back panel and first and second lateral sides, wherein the upper housing further comprises a lateral partitioning wall extending from first and second later sides, the lateral partitioning wall defining a suction chamber below the center slot, and wherein the upper housing further comprises a transverse partitioning wall defining both a vacuum motor chamber and a tilter chamber.

The invention embodiment is additionally characterized wherein each of the upper housing front panel and upper housing back panel further comprises a lifting handle, each of the lifting handles comprising an indentation in the upper housing front and back panels. In addition to the center slot, the worktable further comprises a plurality of blade slots angularly aligned to the center slot.

The cut off saw is further characterized wherein the filter chamber comprises: an access panel covering an area carved out of the first lateral side; a filter cleaning knob connected to a first filter end cap via a connection bolt, the connection bolt penetrating a hole in the access panel; a panel bushing providing translational and rotational support to the connection bolt; a second filter end cap, the first and second filter end caps together securing ends of a cylindrical media tilter; a vacuum suction tube connected to the vacuum apparatus, the vacuum tube penetrating the transverse partitioning wall; and an annular rim protrusion extending from the vacuum suction tube, the annular rim protrusion mating with the second filter end cap via a gasket and a bearing, the second filter end cap further comprising a bearing seat acting as an abutment to the bearing.

Still further, the invention embodiment is characterized wherein the upper housing comprises a lower rim, the lower rim comprising a groove around a perimeter thereof, and wherein the lower dust bin further comprises an upper rim, the upper rim comprising a groove around a perimeter thereof, and wherein the upper and lower rims comprising grooves are matingly and removably connected to each other.

Yet further, the invention embodiment is characterized wherein the lower dust bin first and second lateral sides each comprise a lifting handle, the lifting handles each comprising an indentation in the first and second lateral sides, respectively; and wherein the lower dust bin further comprises a latch for securing the lower dust bin to the upper housing.

In a second aspect, the invention is a cut off saw comprising: a worktable for supporting a work piece; a saw motor mechanically coupled to a circular saw blade; a rotatable arm fixed to the circular saw blade and pivotably secured to the worktable; a filter chamber at an interior to the worktable, the filter chamber comprising: a cylindrical media filter; and a vacuum tube coupled to an interior of the cylindrical media filter providing negative pressure with respect to atmosphere to said interior of the cylindrical media filter.

The cut off saw in this embodiment may be further characterized in that the worktable further comprises: a center slot carved out of the worktable axially aligned to the circular saw blade; and a plurality of blade slots angularly aligned to the center slot. Further, the filter chamber further comprises a filter cleaning flap secured to a lateral partitioning wall at an interior of the filter chamber, the cylindrical filter media having a plurality pleated segments about a cylindrical surface, wherein the tilter cleaning flap contacts the pleated segments when the filter cleaning knob is rotated. Also, the tilter chamber further comprises: an access panel covering an area carved out of the first lateral side; and a filter cleaning knob connected to a first filter end cap via a connection bolt, the connection bolt penetrating a hole in the access panel. Still further, the filter chamber further comprises: a panel bushing providing translational and rotational support to the connection bolt; and a second filter end cap, the first and second filter end caps together securing ends of a cylindrical media filter. Yet still further, the filter chamber further comprises: a vacuum suction tube connected to the vacuum apparatus, the vacuum tube penetrating the transverse partitioning wall; and an annular rim protrusion extending from the vacuum suction tube, the annular rim protrusion mating with the second filter end cap via a gasket and a bearing, the second filter end cap further comprising a bearing seat acting as an abutment to the bearing. To facilitate portability of the cut off saw, the invention additionally comprises two or more wheels.

In a third aspect, the invention may be characterized as a method for cutting masonry objects comprising the steps of: mounting a circular saw blade pivotably with respect to a worktable; carving out a center slot in the worktable aligned to the circular saw blade; aligning a plurality of side slots at an angle to the center slot; imparting a negative pressure with respect to atmosphere to an interior of the worktable; and collecting dust through the center slot and the side slots from the work piece created as a byproduct fro111 use of the circular saw blade.

The method herein may be additionally characterized as comprising: providing start-lip current to a first motor; providing start-up current to a second motor sequentially to minimize undesirable current surges; providing a cylindrical filter below the worktable; and filtering the dust from air passing through the cylindrical filter. The method additionally comprises pleating the cylindrical filter thereby increasing usable surface area of the cylindrical filter.

Still further, the method for cutting masonry objects herein may be characterized as comprising: contacting a filter cleaning flap to the cylindrical filter; rotating a filter cleaning knob; clearing dust from the cylindrical filter; and collecting dust in a dust bin located at an area below the worktable. Also the method includes connecting a vacuum tube to a center area of the cylindrical filter; imparting a negative pressure with respect to atmosphere to a center area of the cylindrical filter; and exhausting filtered air to a lateral side of the worktable. Another method step includes providing a plurality of lifting handles at lateral sides of the worktable.

While the apparatus and method has or will be described for the sake of grammatical fluidity with functional explanations, it is to be expressly understood that the claims, unless expressly formulated under 35 USC §112, or similar applicable law, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC §112 are to be accorded full statutory equivalents under 35 USC §112, or similar applicable law. The invention can be better visualized by turning now to the following drawings wherein like elements are referenced by like numerals.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DETAILED DESCRIPTION OF THE PREFERRED EMBODIMENTS

Figures 1, 2:
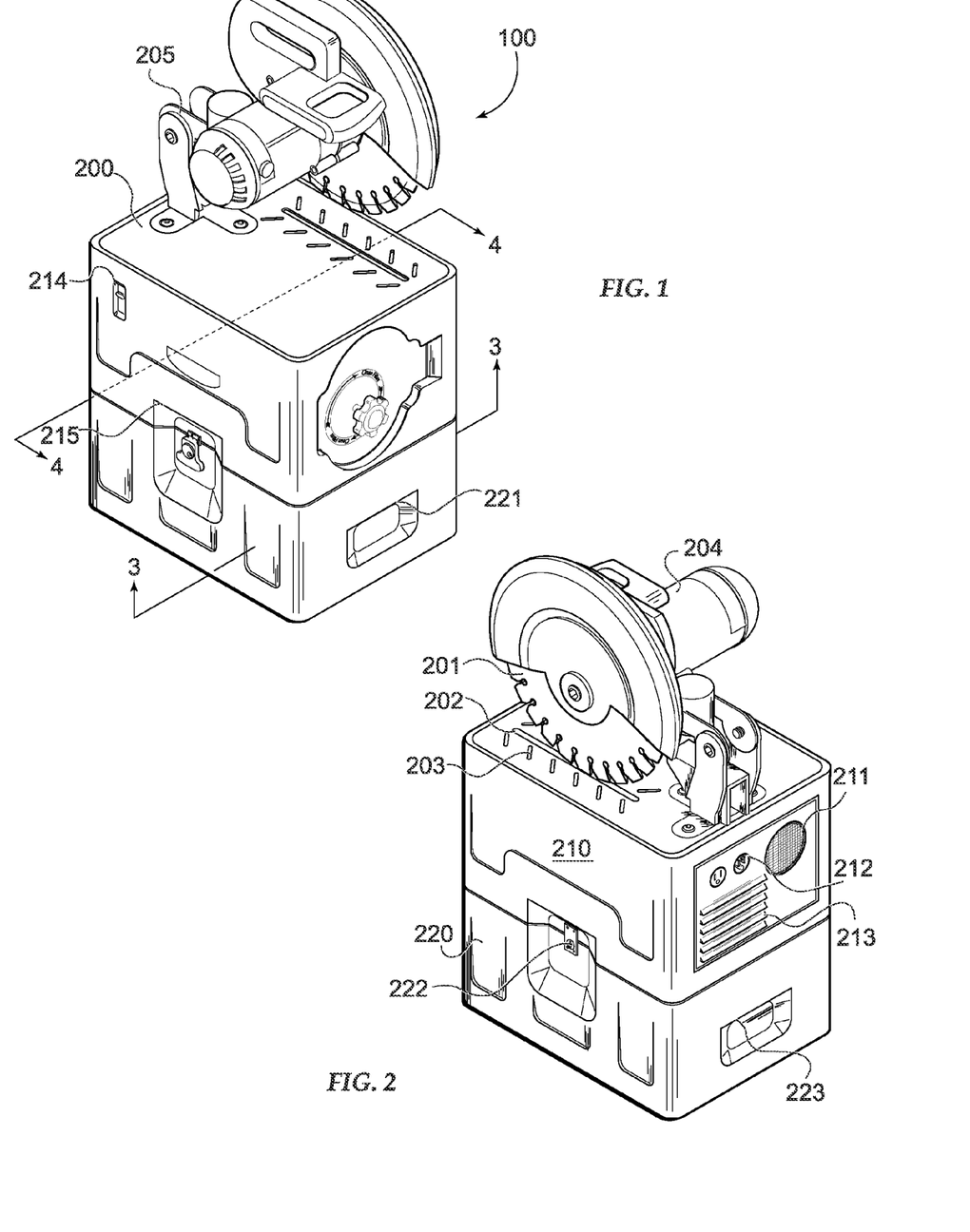
FIG. 1 is a perspective view of a preferred chop saw embodiment of the present invention.
FIG. 2 is a rear perspective view of a the invention embodiment illustrated in FIG. 1.

Referring initially to FIG. 1, a preferred embodiment 100 comprises a cut-off type saw which is configured to cut masonry, and more specifically stones, bricks, pavers, and other masonry items. It should be understood that inventive concepts herein can also apply to woodworking circular saws and additionally saws for cutting plastic and roofing. The dust collection system 100 of the invention works in connection with a specifically configured saw 201, with a unique cutting table 200 and dust collector arrangement. The saw may be a cut-off saw or a chop saw, which has a circular toothed blade 201 or grinding wheel, and which rotates in a vertical plane of rotation as shown. The cut-off saw is further mounted on a pivotable arm 205 which allows the saw to be raised and lowered from a non-cutting position onto a cutting position so that the blade contacts a masonry work piece 420, and is lowered through the work piece 420 as the saw blade cuts.

In the FIG. 1 embodiment, saw 201 is shown coupled to a saw motor 204. It should be further appreciated that a similar circular saw could be coupled to a belt or pulley system for driving the saw 201. Still further, saw 201 is provided with a cutting table 200 which includes a blade center slot 202. As the cutting blade passes through the work piece, the blade continues until it enters the center slot 202; and additionally passes through the surface of the cutting table 200 into the slot 202. Cutting table 200 should be broadly construed as a substantially flat structure supporting a workpiece.

As circular blade 201 teeth engage the work piece 420 (FIG. 4), dust and particulate matter 410 are ejected from the work piece in various directions. A negative pressure provided by vacuum apparatus 321 (FIG. 3) causes air to flow in a downward direction thereby curtailing outward dispersion of the dust and particulate matter 410. In conventional prior art systems, the saw blade 201 would not pass through a blade slot, and thus ejected material would strike the cutting table and be collected after striking the cutting table. In the saw and dust collection system 100 of the present invention, a powerful flow of air is directed past the cutting blade 201, through center slot 202 and angled side slots 203 and into a filter chamber 310 below the cutting table 200. Also importantly, a flow of air is provided to remove dust at the instant the workpiece 420 is contacted by the saw blade 20] and throughout the cutting thereof.

With reference to FIG. 2, a rear perspective view of the present invention is shown. Exhaust port 211 is provided for discharge of filtered air 330. Air vents 213 provide for ventilation and heat transfer from vacuum apparatus 321. Lifting handles 221, 223 are further provided on first and second lateral sides to assist portability of the unit 100. Electrical connections 212 allow for external power to be supplied to the device 100 as shown.

In a preferred embodiment system 100 additionally comprises two motors 204,321; a first 204 that drives the saw blade 201 and a second 321 that provides a prime mover for air flow. The saw and collection system 100 of the present invention may further include a time delay relay associated with power switch 214. When the saw and collection system is switched on, a first of two loads 204,321 is engaged for a pre-determined period of time as designed into the time delay relay. Subsequently, a second of the two electrical loads 204, 321 is engaged. By staggering the two starting current surges, the peak load on the electrical system is reduced. Additionally, this will reduce a likelihood that the system 100 current surge causes a circuit breaker to be tripped.

Figures 7A, 7B:
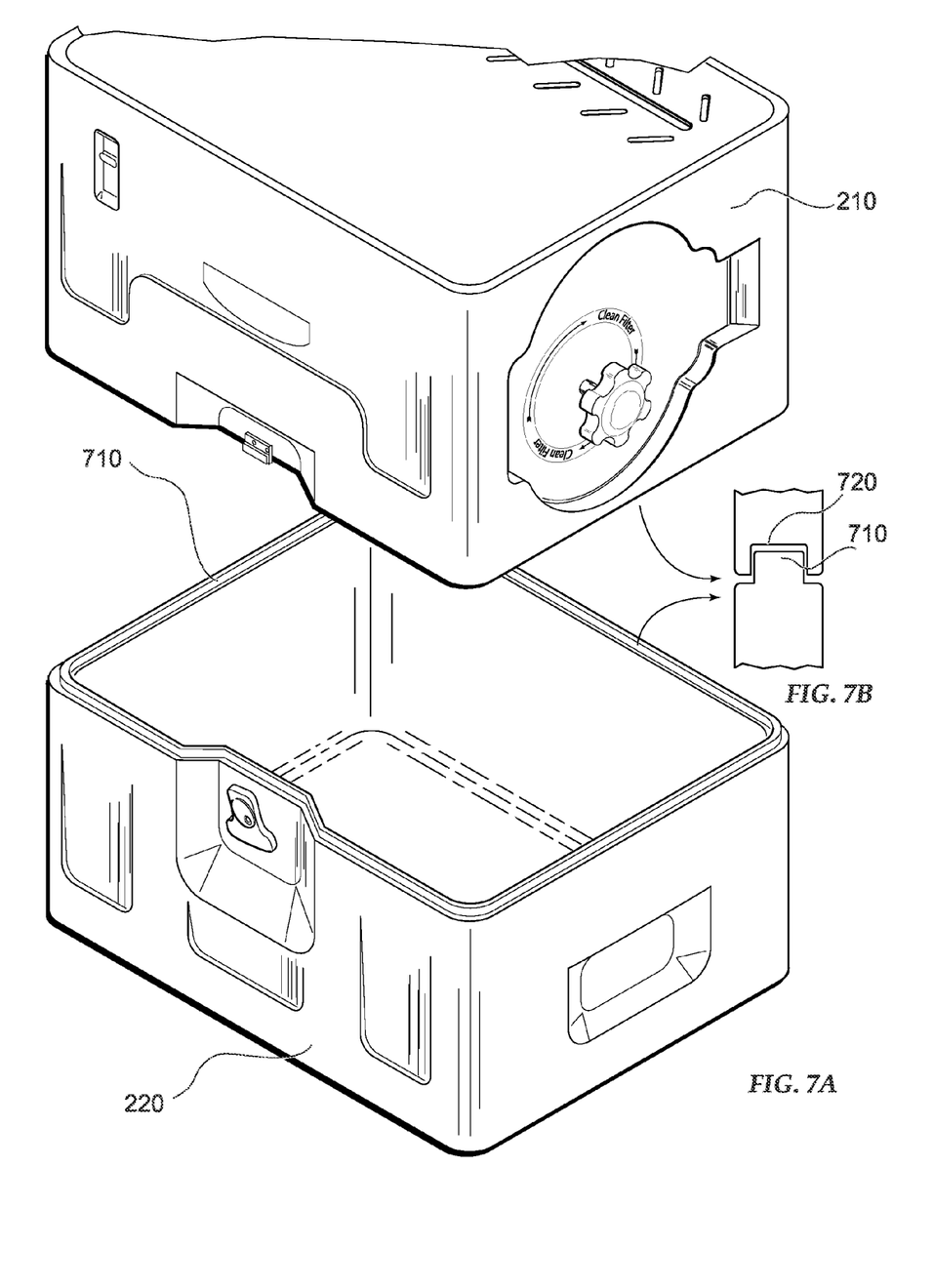
FIG. 7A and FIG. 7B illustrate how an upper housing and a lower dust bin relate to one another.

Also as shown in FIG. 1 and in FIG. 2, the worktable 200 has two separable units, namely upper housing 210 and lower dust bin 220. In addition to lifting handles 221, 223 on lateral sides, lifting handles 215 are provided on a front and a back of the unit 100 to also serve as hand holds for a user transporting the device. Latch 222 is provided to secure upper housing 210 to lower dust bin 220 also as shown in FIG. 7 A and FIG. 7B.

Figure 3:
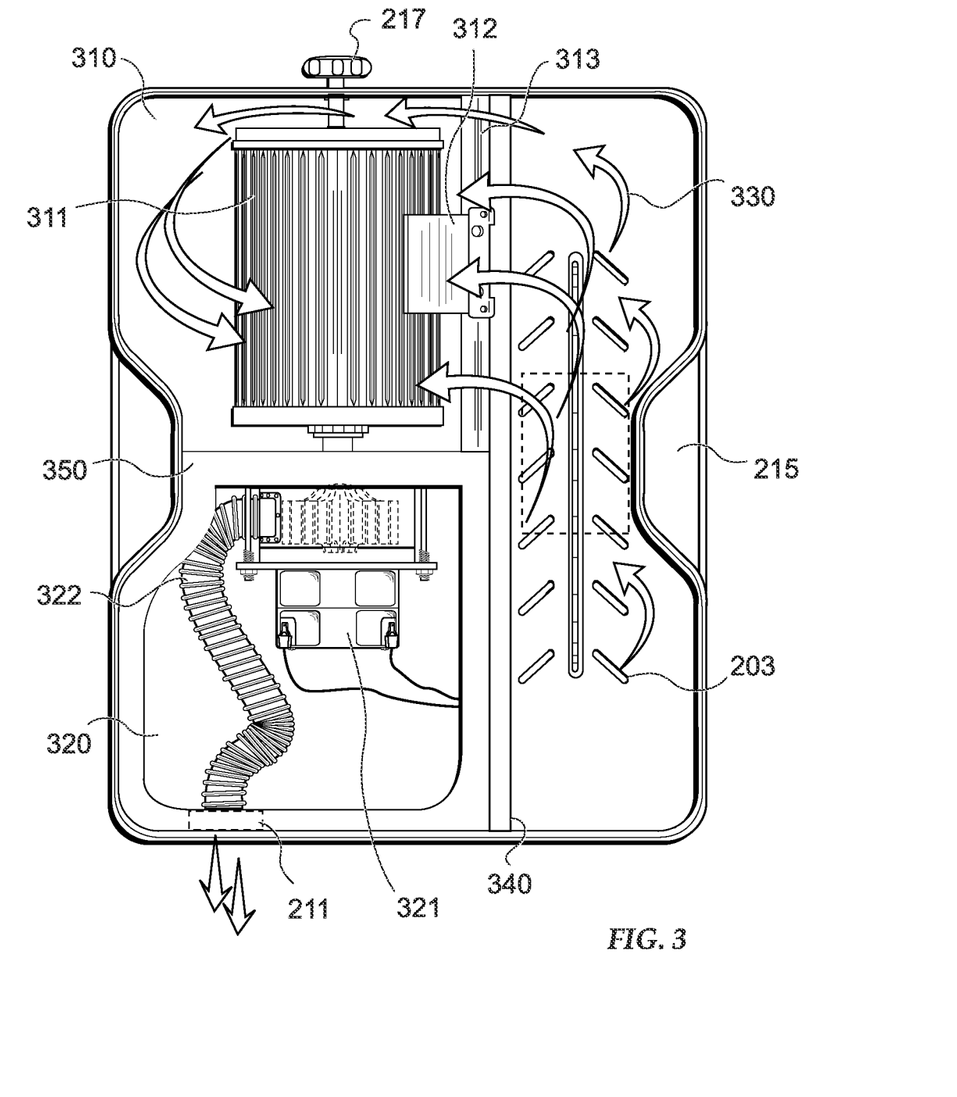
FIG. 3 is cross-sectional view of the invention embodiment as taken along line 3-3 in FIG. 1.

With reference to FIG. 3, a sectional view taken along line 3-3 in FIG. 1 is shown. Particulate matter 410 from workpiece 420 is drawn through center slot 202 and angled side slot 203. It should also be appreciated that side slot could be aligned parallel to the center slot 202 and at right angles thereto. Air containing dust 410 flows as shown by directional arrows 330 around partitioning wall 340. Dust 410 is fm 1 her filtered from the air through cylindrical pleated filter 311. Some of the dust and particulate matter will fall to dust bin 220 and some will be trapped by the filter. Filter cleaning flap 312 is provided connected to a ledge 313 adjacent to partitioning wall 340. The cleaning flap 312 will assist in clearing the cylindrical filter 311 when a user rotates knob 217. Translational wall 350 serves to separate filter chamber 310 from vacuum chamber 320. Exhaust hose 322 is shown in the vacuum chamber 320 for exhausting air to an exterior of the device 100. The vacuum apparatus 321 may use various types of motors to generate negative pressure and CFM to include blower motor, centrifugal fan, squirrel cage fan, propeller fan, or any other conventional moving device.

Figure 4:
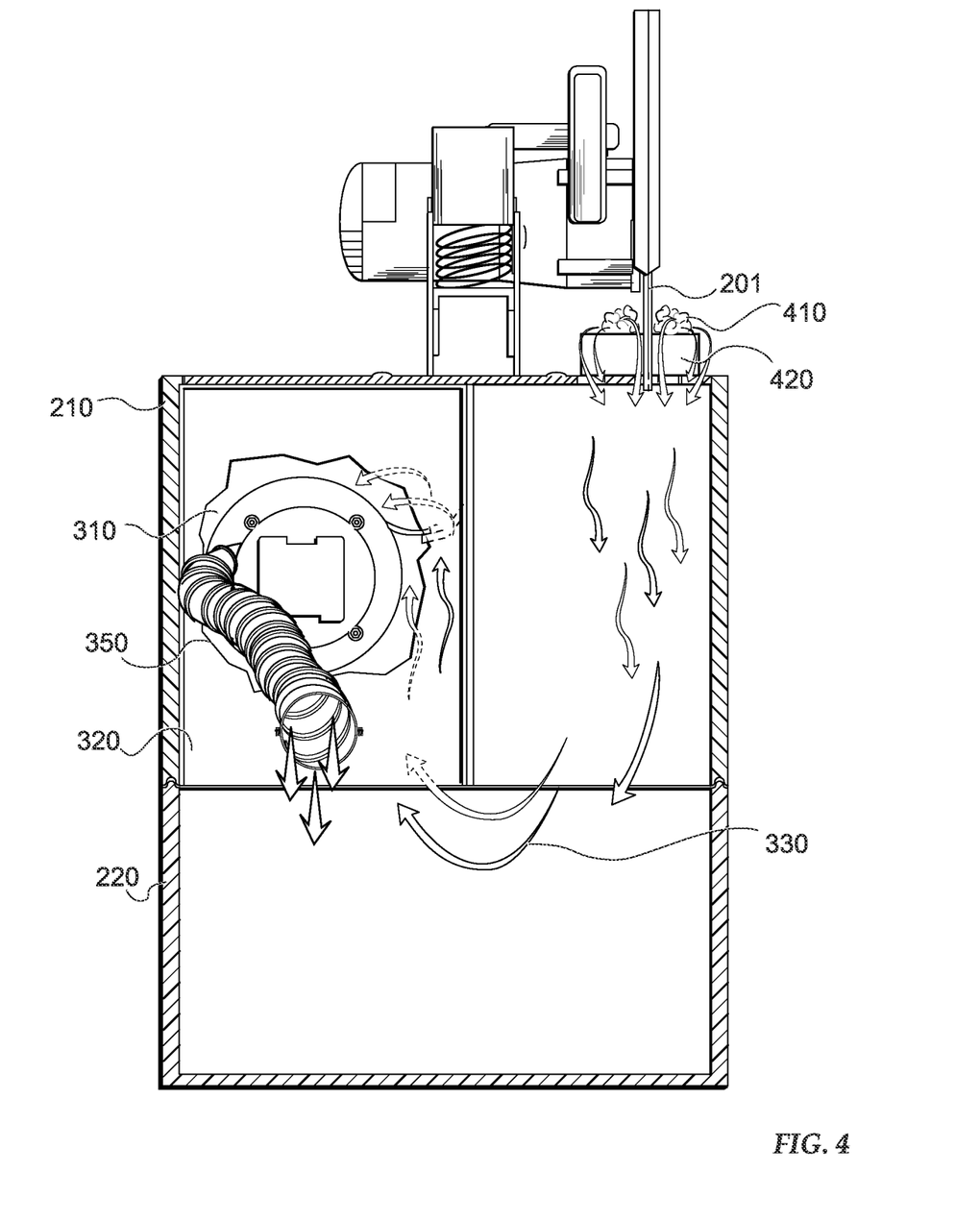
FIG. 4 is a cross-sectional view of the invention embodiment as taken along line 4-4 in FIG. 1.

FIG. 4 similarly shows the flow of air with directional arrows 330 as a sectional view along line 4-4 of FIG. 1. A cutaway in translational wall 350 reveals filter compartment 310. It will be appreciated that other configurations for filter chamber 310 and vacuum chamber 320 could be well within the scope of the present invention, such as, for example the filter chamber 310 configured directly below slots 202, 203.

Figures 5A, 5B:
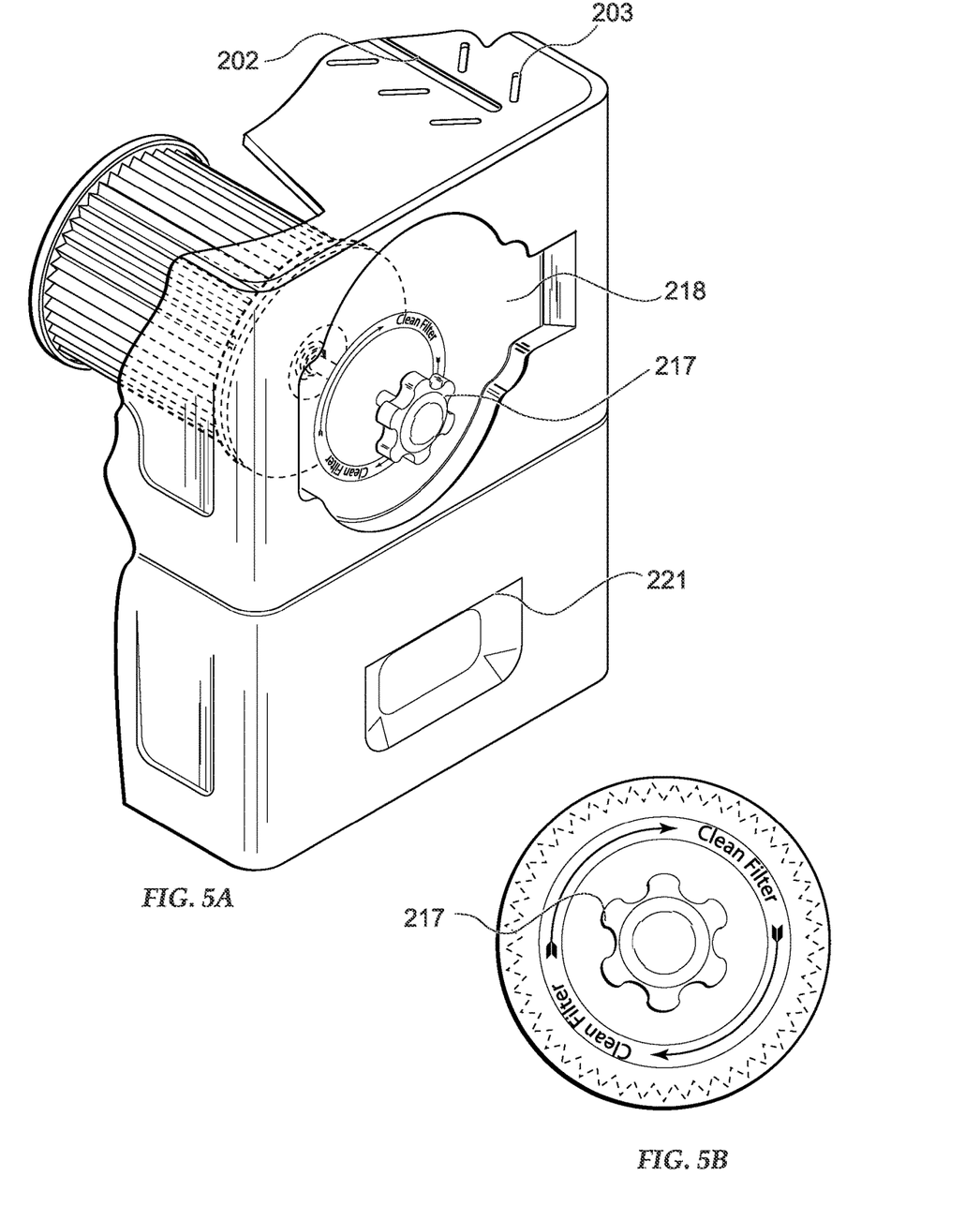
FIG. 5A is close up cut-away view of the perspective illustration shown in FIG. 1.
FIG. 5B is an end view of a filter cleaning knob of the present invention.

FIG. 5A shows a closer view of the embodiment 100 in the FIG. 1 illustration. The cut-a-way view also reveals a perspective illustration of the pleated cylindrical filter 311. A carve out in a lateral side of upper housing 210 is provided to accommodate access panel 218. Filter cleaning knob 217 is connected to the cylindrical filter 311 through the access panel 218 as further illustrated in FIG. 6. Access panel 218 can further be removed for maintenance and disassembly of the cylindrical filter 311 for replacement or deep cleaning. FIG. 5 shows an end view of filter cleaning knob 217.

Figure 6:
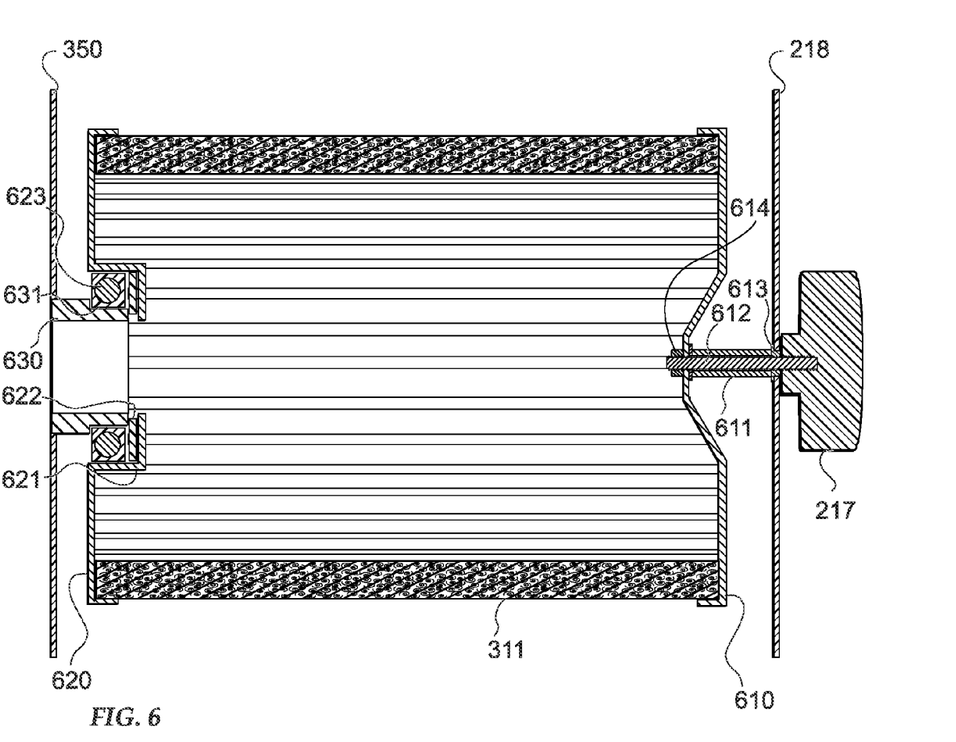
FIG. 6 is a schematical illustration of a cylindrical filter configuration embodiment of the present invention.

FIG. 6 illustrates more specifically how a cylindrical filter 311 connects to a vacuum apparatus 321 via vacuum tube 630 penetrating transverse wall 350. Initially, filter 311 is supported on it is sides by filter end caps 610, 620. Knob 217 connects to the first end cap 610 via coupler spacing 611 and connection bolt 612. Panel bushing 613 provides translational and rotational support to connection bolt 612. Hexagonal nut 614 secures the first filter end cap 610. At the other end, vacuum tube 630 has an annular rim 631 protruding therefrom and provides an abutment for bearing 623 also supported by gasket 622. Recess 621 in the second filter end cap 620 provides the space to connect bearing 623 around rim 631 as shown.

FIG. 7A and FIG. 7B provide a more detailed view of how upper housing 210 connects to lower dust bin 220. Rim 710 mates with groove 720 as shown for a secure connection upon closure of latch 222. An inside of the dust bin 220 shows an area where dust ultimately settles for later removal.

While the particular Chop Saw with Dust Collection System herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

What is claimed is:

1. A worktable comprising:
    a top portion configured to support a work piece, wherein the top portion comprises a blade slot configured to receive a blade;
    a filter chamber below the top portion and comprising a filter, wherein the filter chamber is configured to receive dust via the blade slot resulting from a cutting of the work piece; and
    a vacuum device coupled to the filter and configured to provide a negative pressure within the filter chamber, the negative pressure creating a downward air flow through the blade slot into the filter chamber, wherein
        the filter is a cylindrical filter coupled to a filter cleaning knob configured to rotate the cylindrical filter, and wherein
        the filter chamber further comprises a filter cleaning flap coupled to the cylindrical filter and configured to sequentially make contact with a plurality of pleated segments of the cylindrical filter as the filter cleaning knob is rotated.

2. The worktable of claim 1, further comprising a housing coupled to the top portion, wherein the housing is positioned below the top portion and comprises four sides extending downwardly from the top portion, and wherein the housing is configured to substantially enclose at least the filter chamber.

3. The worktable of claim 2, further comprising a vacuum chamber configured to house the vacuum device, wherein the housing is further configured to substantially enclose the vacuum chamber.

4. The worktable of claim 3, further comprising a transverse partitioning wall configured to separate the vacuum chamber and the filter chamber.

5. The worktable of claim 2, further comprising a dust bin positioned below the filter chamber, wherein the housing is further configured to substantially enclose the dust bin.

6. The worktable of claim 1, further comprising:
    a connection bolt configured to connect the filter cleaning knob to a first filter end cap, wherein the connection bolt penetrates a hole in an access panel;
    a panel bushing configured to provide translational and rotational support to the connection bolt;
    a second filter end cap, wherein the first filter end cap and the second filter end cap are respectively configured to secure opposite ends of the cylindrical filter;
    a vacuum suction tube connected to the vacuum device; and
    an annular rim protrusion extending from the vacuum suction tube, the annular rim protrusion configured to mate with the second filter end cap via a gasket and a bearing, wherein the second filter end cap further comprises a bearing seat acting as an abutment to the bearing.

7. A worktable comprising:
    a top portion configured to support a work piece, wherein the top portion comprises a blade slot; and
    a housing coupled to the top portion, wherein the housing is positioned below the top portion and comprises four sides extending downwardly from the top portion, and wherein the housing comprises at least a filter chamber and a vacuum chamber separated by a partitioning wall, the filter chamber configured to substantially enclose a filter, and the vacuum chamber configured to substantially enclose a vacuum device, wherein the partitioning wall comprises an opening configured to facilitate a coupling of the filter and the vacuum device via the partitioning wall, wherein
        the filter is a cylindrical filter coupled to a filter cleaning knob configured to rotate the cylindrical filter, and wherein
        the filter chamber further comprises a filter cleaning flap coupled to the cylindrical filter and configured to sequentially make contact with a plurality of pleated segments of the cylindrical filter as the filter cleaning knob is rotated.

8. The worktable of claim 7, the housing comprising an upper housing portion and a lower housing portion, wherein the upper housing portion is configured to house the filter chamber and the vacuum chamber, and wherein the lower housing portion is configured to house a dust collection bin.

9. The worktable of claim 7, further comprising:
    a connection bolt configured to connect the filter cleaning knob to the cylindrical filter, wherein the connection bolt penetrates a hole in an access panel; and
    a panel bushing configured to provide translational and rotational support to the connection bolt.

10. The worktable of claim 7, further comprising a vacuum suction tube inserted through the opening of the partitioning wall, wherein the vacuum suction tube is configured to connect to the vacuum device on a first end and to the filter on a second end to facilitate the coupling of the filter and the vacuum device.

11. A worktable comprising:
    a top portion configured to support a work piece, wherein the top portion comprises a blade slot; and
    a housing coupled to the top portion, wherein the housing is positioned below the top portion and comprises four sides extending downwardly from the top portion, and wherein the housing comprises at least a vacuum chamber and a dust collection bin, the vacuum chamber configured to substantially enclose a vacuum device and to facilitate a negative pressure below the blade slot, and the dust collection bin configured to collect a dust byproduct of the work piece via a downward air flow through the blade slot created by the negative pressure, wherein
        the housing further comprising a filter chamber configured to substantially enclose a cylindrical filter coupled to a filter cleaning knob configured to rotate the cylindrical filter, and wherein
        the filter chamber further comprises a filter cleaning flap coupled to the cylindrical filter and configured to sequentially make contact with a plurality of pleated segments of the cylindrical filter as the filter cleaning knob is rotated.

12. The worktable of claim 11, wherein the filter chamber is separated from the vacuum chamber by a partitioning wall, and wherein the partitioning wall comprises an opening configured to facilitate a coupling of the filter and the vacuum device via the partitioning wall.

13. The worktable of claim 12, the housing comprising an upper housing portion and a lower housing portion, wherein the upper housing portion is configured to house the filter chamber and the vacuum chamber, and wherein the lower housing portion is configured to house the dust collection bin.

14. The worktable of claim 11, further comprising:
   a connection bolt configured to connect the filter cleaning knob to the cylindrical filter, wherein the connection bolt penetrates a hole in an access panel; and
   a panel bushing configured to provide translational and rotational support to the connection bolt.

\* \* \* \* \*